US008757711B2

(12) United States Patent
Bertocchi

(10) Patent No.: US 8,757,711 B2
(45) Date of Patent: Jun. 24, 2014

(54) VEHICLE SEAT

(75) Inventor: Marcelo Bertocchi, Indaiatuba (BR)

(73) Assignee: GM Global Technology Operations LLC, Detroit, MI (US)

( * ) Notice: Subject to any disclaimer, the term of this patent is extended or adjusted under 35 U.S.C. 154(b) by 71 days.

(21) Appl. No.: 13/424,629

(22) Filed: Mar. 20, 2012

(65) Prior Publication Data

US 2013/0249264 A1   Sep. 26, 2013

(51) Int. Cl.
*A47C 7/56* (2006.01)
*B60N 2/30* (2006.01)
*B60N 2/32* (2006.01)

(52) U.S. Cl.
CPC ... *B60N 2/30* (2013.01); *B60N 2/32* (2013.01)
USPC ....... 297/14; 297/283.1; 297/283.3; 297/112; 297/378.1; 296/67; 296/65.09

(58) Field of Classification Search
CPC ............ A47C 13/00; A47C 1/10; B60N 2/26; B60N 2/30; B60N 2/32; B60N 2/3063; B60N 2/3081; B60N 2/3084; B60N 2/3088
USPC ............... 297/14, 15, 254, 255, 283.1–283.4, 297/284.11, 378.1, 378.14, 238, 112, 113, 297/115; 296/65.16, 67, 65.05, 65.09
See application file for complete search history.

(56) References Cited

U.S. PATENT DOCUMENTS

| 3,151,906 | A | * | 10/1964 | Roberts | 296/66 |
| 4,756,573 | A | * | 7/1988 | Simin et al. | 297/250.1 |
| 5,121,965 | A | * | 6/1992 | Skold et al. | 297/256.1 |
| 5,472,260 | A | * | 12/1995 | Czapski et al. | 297/112 |
| 6,488,327 | B1 | | 12/2002 | Pearse et al. | |
| 6,883,854 | B2 | * | 4/2005 | Daniel | 296/65.03 |
| 7,077,463 | B2 | * | 7/2006 | Sun et al. | 297/15 |
| 7,195,302 | B2 | | 3/2007 | Jovicevic | |
| 2013/0038082 | A1 | | 2/2013 | Bertocchi | |

FOREIGN PATENT DOCUMENTS

| DE | 3102844 A1 | 8/1982 |
| DE | 4136363 A1 | 5/1993 |
| DE | 4224427 A1 | 1/1994 |
| DE | 19902966 A1 | 4/2000 |
| DE | 19957380 C1 | 3/2001 |

* cited by examiner

*Primary Examiner* — Sarah B McPartlin
(74) *Attorney, Agent, or Firm* — Quinn Law Group, PLLC

(57) ABSTRACT

A vehicle includes a vehicle seat assembly having a seatback member and a lower seat member. The lower seat member has a generally horizontal and upwardly-facing seating surface. The seatback member has a cushion portion and is selectively rotatable between an upright position in which the cushion portion is adjacent the wall and a lowered position in which the cushion portion extends farther forward than the seating surface. The seatback member functions to support the back or head of an occupant (when the seatback member is in the upright position) or as an extension to the lower seat member to provide additional fore/aft support to a child seat.

20 Claims, 1 Drawing Sheet

VEHICLE SEAT

TECHNICAL FIELD

This invention relates to seats for vehicle occupants.

BACKGROUND

Vehicle seats typically include a lower seat portion and a seatback portion. The lower seat portion has a generally horizontal surface for supporting an occupant, and the seatback portion has a generally vertical surface for supporting the back of an occupant. In some vehicles, such as extended-cab pickup trucks, the fore/aft dimension of the lower seat portion is limited by the size of the passenger compartment or other considerations.

SUMMARY

According to a first aspect of the disclosure, a vehicle includes a vehicle body that defines a passenger compartment and that has a generally vertical wall. A vehicle seat assembly has a seatback member and a lower seat member at least partially disposed within the passenger compartment. The lower seat member is mounted with respect to the vehicle body and has a generally horizontal and upwardly-facing seating surface. The seatback member has a cushion portion and at least one support portion that is operatively connected to the cushion portion such that the cushion portion and the support portion cooperate to define an open space therebetween.

The seatback member is rotatably mounted with respect to the body such that the seatback member is selectively rotatable between an upright position in which the cushion portion is adjacent the wall and a lowered position in which the cushion portion extends farther forward than the seating surface. The lower seat member is at least partially within the opening when the seatback member is in the lowered position.

Accordingly, when the seatback member is in the upright position, the cushion portion is positioned to support the back of an occupant of the seat assembly. When the seatback member is in the lowered position, the cushion portion, which extends farther forward than the seating surface, increases the effective fore/aft dimension of the seating surface, i.e., the cushion portion may cooperate with the lower seat portion to support an object such as a child seat. The opening formed by the seatback member accommodates at least part of the lower seat member, which enables the seat assembly to have a low vertical profile when the seatback member is in the lowered position.

According to a second aspect of the disclosure, a vehicle includes a vehicle body that defines a passenger compartment and that has a generally vertical wall. A vehicle seat assembly has a seatback member and a lower seat member at least partially disposed within the passenger compartment. The lower seat member is mounted with respect to the vehicle body and has a generally horizontal and upwardly-facing seating surface.

The seatback member has a cushion portion and is rotatably mounted with respect to the body such that the seatback member is selectively rotatable between an upright position in which the cushion portion is adjacent the wall and a lowered position in which the cushion portion extends farther forward than the seating surface. At least a portion of the seating surface is not covered by the seatback member when the seatback member is in the lowered position.

Thus, when the seatback member is in the upright position, the cushion portion is positioned to support the back of an occupant of the seat assembly. When the seatback member is in the lowered position, the cushion portion, which extends farther forward than the seating surface, increases the effective fore/aft dimension of the seating surface. Since the seating surface is not covered by the seatback member, fastening systems for attaching a child seat may remain exposed for use. Accordingly, the seatback member may function as a seatback (or a portion thereof, such as a head rest) for a seat assembly (when connected to the wall) or as an extension to the lower seat member to provide additional fore/aft support to a child seat.

The above features and advantages and other features and advantages of the present invention are readily apparent from the following detailed description of the best modes for carrying out the invention when taken in connection with the accompanying drawings.

DETAILED DESCRIPTION

Figure 1:
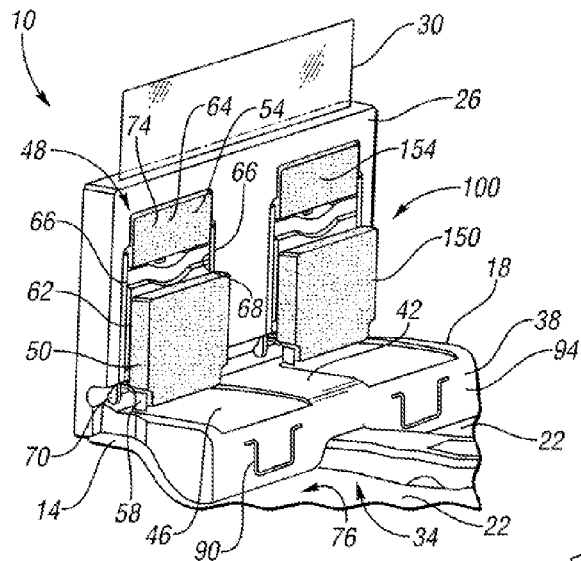
FIG. 1 is a schematic, perspective view of a set of jump seats in a stowed configuration in a pickup truck.

Referring to FIG. 1, a vehicle 10 includes a vehicle body 14, only a portion of which is shown in FIG. 1. The vehicle body 14 in the embodiment depicted has a pickup truck configuration, which includes a cab portion 18. The cab portion 18 includes a floor 22, a generally vertical rear wall 26, and a rear window 30 extending upward from the rear wall 26. The floor 22, rear wall 26, and window 30 cooperate with other body components to define a passenger compartment 34.

The body 14 includes structure 38 that defines a generally horizontal (i.e., more horizontal than vertical) support surface 42 that is higher than the floor 22. In the embodiment depicted, the surface 42 is horizontal and defines a concavity 46. The passenger compartment 34 contains a plurality of vehicle seats for supporting vehicle occupants. The vehicle 10 includes front seats (not shown), including a driver seat and a front passenger seat. The vehicle 10 includes a rear seat assembly 48 disposed in the passenger compartment 34 rearward of the front seats.

Figure 2:
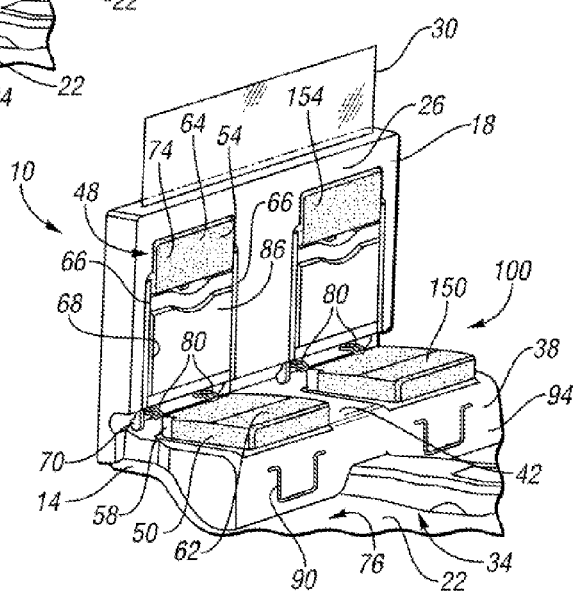
FIG. 2 is a schematic, perspective view of the jump seats of FIG. 1 in a deployed configuration.
Figure 3:
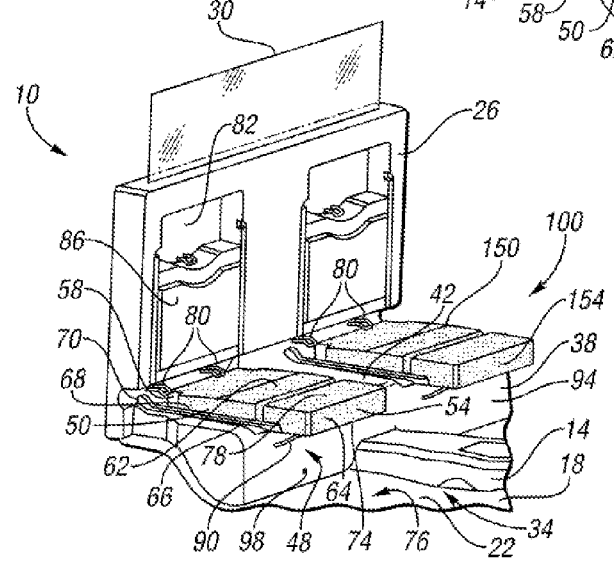
FIG. 3 is a schematic, perspective view of the jump seats of FIGS. 1 and 2 in an extended configuration.

The rear seat assembly 48 includes a lower seat member 50 and a seatback member 54. The lower seat member 50 is movably mounted with respect to the rear wall 26 and the structure 38 such that the lower seat member 50 is selectively movable with respect to the rear wall 26 between a stowed position, as shown in FIG. 1, and a deployed position, as shown in FIGS. 2 and 3. More specifically, in the embodiment depicted, the lower seat member 50 is mounted with respect to the wall 26 via hinges 58 such that the lower seat member 50 is selectively rotatable about the hinges 58 (and a horizontal, transverse axis) between the stowed and deployed positions.

Referring specifically to FIG. 1, the lower seat member 50 in the stowed position is generally vertical, i.e., more vertical than horizontal, and is generally parallel with the rear wall 26. The lower seat member 50 has a seating surface 62 that is generally vertical and that faces and abuts the rear wall 26 in the stowed position. Referring specifically to FIG. 2, the lower seat member 50 in the deployed position is rotated approximately ninety degrees from its stowed position such that the lower seat member 50 is generally horizontal. In the embodiment depicted, the lower seat member 50 contacts, and is supported by, the surface 42 inside concavity 46, and the seating surface 62 is generally horizontal and upwardly facing to support a human occupant.

Referring again to FIG. 1, the seatback member 54 includes a cushion portion 64 and two support portions 66. The two support portions 66 are laterally spaced apart from one another and are rigidly connected to the cushion portion 64. In the embodiment depicted, the support portions 66 are straight rods, though other support portions may be employed within the scope of the claimed invention. The support portions 66 may be extensions of the frame (not shown) of the cushion portion 64, or may be separate elements that are mounted to the frame of the cushion portion 64. The cushion portion 64 and the support portions 66 cooperate to define an opening 68 therebetween.

The seatback member 54 is movably mounted with respect to the rear wall 26 and the structure 38 such that the seatback member 54 is selectively movable with respect to the rear wall 26 between an upright position, as shown in FIGS. 1 and 2, and a lowered position, as shown in FIG. 3. More specifically, in the embodiment depicted, each of the support portions 66 are mounted to a respective hinge 70. The hinges 70 are mounted with respect to the structure 38. The seatback member 54 is selectively rotatable (about a horizontal, transverse axis) with respect to the structure 38 and the rear wall 26 between the upright and the lowered positions.

The seat assembly 48 is a foldable jumpseat that is movable between three configurations, namely: (1) a stowed configuration, as shown in FIG. 1, (2) a deployed configuration, as shown in FIG. 2, and (3) an extended configuration, as shown in FIG. 3. Referring specifically to FIG. 1, when the seat assembly 48 is in the stowed configuration, the lower seat member 50 is in its stowed position relative to the rear wall 26 and the structure 38, and the seatback member 54 is in its upright position. The stowed configuration of the seat assembly 48 is intended for cargo transportation in the rear of the passenger compartment 34.

Referring to FIG. 2, when the seat assembly 48 is in the deployed configuration, the lower seat member 50 is in the deployed position. The seatback member 54, in its upright position, is positioned to function as a seatback portion of the seat assembly 48. More specifically, the seatback member 54 includes a surface 74 that is generally vertical and faces forward when the seatback member 54 is in the upright position for supporting the back of the occupant. In the embodiment depicted, the cushion portion 64 abuts the rear wall 26 in the upright position. To function as a seatback, the cushion portion 64 extends higher than the seating surface 62 and is rearward of most or all of the seating surface 62. Thus, in the deployed configuration, the seat assembly 48 is configured to be occupied by a passenger. The structure 38 and the floor 22 cooperate to define a footwell 76 for the passenger's feet.

Referring to FIG. 3, when the seat assembly 48 is in the extended configuration, the lower seat member 50 is in its deployed position, and the seatback member 54 is in the lowered position. In the lowered position, at least a portion of the cushion portion 64 is positioned directly forward of the lower seat member 50, thereby extending the effective fore/aft dimension of the lower seat portion of the seat assembly 48. More specifically, the cushion portion 64 extends over a portion of the footwell 76. In the embodiment depicted, the surface 74 of the seatback member 54 faces downward. The seatback member 54 includes another surface 78 on the cushion portion 64. The surface 78 faces upward when the seatback member 54 is in the lowered position (the surface 78 faces generally rearward toward the wall 26 when the seatback member portion 54 is in the upright position). The surface 78 is adjacent to, and/or abuts, the seating surface 62 of the lower seat member 50. The surface 78 is also generally horizontal, and thus surfaces 62 and 78 cooperate to provide an extended support surface for a child seat (not shown).

Accordingly, the seat assembly 48 is converted from the deployed configuration (in which an adult may occupy the seat assembly 48) to the extended configuration (for supporting a child seat) by rotating the seatback member 54 about the hinges 70 from the upright position to the lowered position. When the seatback member 54 is in the lowered position, the support portions 66 rest on surface 42, which prevents movement of the seatback member 54 past the lowered position.

When the seatback member 54 is in the lowered position, and the lower seat member 50 is in the deployed position, at least a portion of the lower seat member 50 extends into or through the opening 68 to accommodate the lower seat member 50. In the embodiment depicted, the opening 68 extends through the seatback member 54, and thus all, or substantially all, of the seating surface 62 is exposed and uncovered by the seatback member 54. Accordingly, hooks or anchors 80, which are mounted to the body 14 adjacent the rearward portion of the seating surface 62, are exposed and available for use to attach a child restraint seat. Anchors 80 may, for example, be of the type known as ISOFIX (which conform to International Organization for Standardization standard ISO 13216) or LATCH (Lower Anchors and Tethers for Children). Alternatively, and within the scope of the claimed invention, the opening 68 may be a concavity that is open on one side to receive the lower seat member 50, but may be closed such that the seating surface 62 is covered by the seatback member.

Thus, the support portions 66 are positioned not to interfere with the lower seat member 50 during movement of the lower seat member 50 between the stowed and deployed positions, and during movement of the seatback member 54 between the upright and lowered positions. More specifically, in the embodiment depicted, the support portions 66 are spaced apart from one another such that the lower seat member 50 can fit between them. The rear wall 26 in the embodiment depicted defines a concavity 82 in which the seatback member 54 is at least partially disposed in the first position.

It should be noted that, in the embodiment depicted, the seatback member 54 remains connected to the body 14 via the hinges 70 during movement of the seatback member 54 between the upright and lowered positions. The seatback member 54 is connected to the body 14 such that movement of the seatback member 54 between the upright and lowered positions is restrained or restricted to one path, which, in the embodiment depicted, is an arc but which may take other shapes within the scope of the claimed invention.

It should also be noted that the seatback member 54 may form the entire seatback portion of the seat assembly 48, or, as shown in the embodiment depicted, the seatback member may form only a portion of the seatback portion. For example, and within the scope of the claimed invention, the cushion portion 64 may function as a head rest, and another cushioned member 86, which is attached to, or part of, the wall 26, forms the remainder of the seatback portion.

The lower seat member 50 includes a cover that defines the seating surface 62. The cover may be formed by a flexible material such as fabric, leather, or vinyl. The lower seat member 50 may include a frame (not shown) and cushioning material (not shown) inside the cover. The cushion portion 64 of the seatback member 54 includes another cover that defines surface 74. The cover may be formed by a flexible material such as fabric, leather, or vinyl. The cushion portion 64 may also include a frame (not shown) and cushioning material (not shown) inside the cover.

Referring to FIGS. 1-3, a support member 90 is rotatably mounted to the front surface 94 of the structure 38. The support member 90 in the embodiment depicted is generally C-shaped, and is pivotably connected at each end to the surface 94 via brackets (not shown). The support member 90 is selectively rotatable between a stowed position, as shown in FIGS. 1 and 2, and a deployed position, as shown in FIG. 3. In the stowed position, a clip (shown at 98 in FIG. 3) releasably secures the support member 90 against the surface 94. In the deployed position, the support member 90 contacts, and is clipped to, the bottom of the seatback member 54 to further support the seatback member 54 in its lowered position.

It should be noted that, within the scope of the claimed invention, the wall 26 may have single-piece construction or may include multiple pieces operatively connected to one another to define the wall 26. Furthermore, although the rear seat assembly 48 is a foldable jump seat, other seat assemblies may be employed within the scope of the invention. For example, a seat assembly may include a lower seat member 50 that is substantially rigidly connected with respect to the wall 26, rather than being rotatable.

In the embodiment depicted, the vehicle body 14 includes two rear seat assemblies 48, 100. Seat assembly 100 is substantially identical to seat assembly 48, but is located on a different side of the passenger compartment 34 from seat assembly 48. More specifically, seat assembly 100 includes a lower seat member 150 that is substantially identical to the lower seat member 50 and that is rotatably mounted with respect to the rear wall 26 and the structure 38 to function in a manner identical to that of the lower seat member 50. Seat assembly 100 also includes a seatback member 154 that is substantially identical to the seatback member 54 and that is rotatably mounted with respect to the body 14 to function in a manner identical to that of the seatback member 54. Accordingly, the seatback member 154 functions in an identical manner as the seatback member 54 to alternatively form a seatback portion for seat assembly 100 or to extend the fore/aft dimension of the lower seat portion 150.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
a vehicle body having a generally vertical wall at least partially defining a passenger compartment;
a vehicle seat assembly including a seatback member and a lower seat member integrated with the generally vertical wall and at least partially disposed within the passenger compartment;
the lower seat member being rotatably mounted to the vehicle body and having a seating surface;
wherein the lower seat member is selectively rotatable between a stowed position in which the seating surface is generally vertical and adjacent the generally vertical wall and a deployed position in which the seating surface is generally horizontal and upwardly facing;
the seatback member having a cushion portion and at least one support portion that is operatively connected to the cushion portion such that the cushion portion and the at least one support portion cooperate to define an open space therebetween;
wherein the seatback member is rotatably mounted with respect to the body such that the seatback member is selectively rotatable between an upright position in which the cushion portion is recessed into a concavity defined by the wall and a lowered position in which the cushion portion extends farther forward than the seating surface;
wherein substantially all of the lower seat member is forward of the seatback member when the lower seat member is in the stowed position and the seatback member is in the upright position;
wherein the lower seat member is at least partially within the opening when the seatback member is in the lowered position;
wherein the vehicle body includes a floor that at least partially defines a footwell forward of the lower seat member; and
wherein the cushion portion extends over at least a portion of the footwell when the seatback portion is in the lowered position.

2. The vehicle of claim 1, wherein substantially all of the seating surface is not covered by the seatback member when the seatback member is in the lowered position.

3. The vehicle of claim 1, wherein the at least one support portion includes two support portions that are spaced apart from one another; and
wherein the lower seat member is at least partially disposed between the two support portions when the seatback member is in the lowered position.

4. The vehicle of claim 1, wherein at least part of the cushion portion is directly forward of the lower seat member when the seatback member is in the lowered position.

5. The vehicle of claim 1, further comprising:
a pair of child seat anchors mounted to the body adjacent a rearward portion of the seating surface;
wherein the pair of child seat anchors are covered when the lower seat member is in the stowed position and exposed when the lower seat member is in the deployed position.

6. The vehicle of claim 1, further comprising:
a cushioned member attached to the generally vertical wall and defining a seatback portion;
wherein the seating surface is adjacent the cushioned member with the lower seat member in the stowed position.

7. A vehicle comprising:
a vehicle body having a generally vertical wall at least partially defining a passenger compartment;
a vehicle seat assembly including a seatback member and a lower seat member integrated with the generally vertical wall and at least partially disposed within the passenger compartment;
the lower seat member being rotatably mounted to the vehicle body and having a seating surface;
wherein the lower seat member is selectively rotatable between a stowed position in which the seating surface is generally vertical and adjacent the generally vertical wall and a deployed position in which the seating surface is generally horizontal and upwardly facing;
a pair of child seat anchors mounted to the body adjacent a rearward portion of the seating surface;
wherein the pair of child seat anchors are covered when the lower seat member is in the stowed position and exposed when the lower seat member is in the deployed position;
the seatback member having a cushion portion and being rotatably mounted with respect to the body such that the seatback member is selectively rotatable between an upright position in which the cushion portion is adjacent the wall and a lowered position in which the cushion portion extends farther forward than the seating surface;

wherein at least a portion of the seating surface is not covered by the seatback member when the seatback member is in the lowered position;

wherein the vehicle body includes a floor that at least partially defines a footwell forward of the lower seat member; and wherein the cushion portion extends over at least a portion of the footwell when the seatback portion is in the lowered position.

8. The vehicle of claim 7, wherein substantially all of the seating surface is not covered by the seatback member when the seatback member is in the lowered position.

9. The vehicle of claim 7, wherein the seatback member includes two support portions that are spaced apart from one another and that connect the cushion portion to the vehicle body; and wherein the lower seat member is at least partially disposed between the two support portions when the seatback member is in the lowered position.

10. The vehicle of claim 7, wherein at least part of the cushion portion is directly forward of the lower seat member when the seatback member is in the lowered position.

11. The vehicle of claim 7, further comprising:

wherein substantially all of the lower seat member is forward of the seatback member when the lower seat member is in the stowed position and the seatback member is in the upright position.

12. The vehicle of claim 7, further comprising:

a cushioned member attached to the generally vertical wall and defining a lower portion of a seatback portion;

wherein the seating surface is adjacent the cushioned member with the lower seat member in the stowed position.

13. A vehicle comprising:

a vehicle body having a wall that at least partially defines a passenger compartment and a footwell;

the wall including a generally vertical wall portion and a generally horizontal support surface disposed between the generally vertical wall portion and the footwell;

a seat assembly having a lower seat member and a seatback member integrated with the wall;

the lower seat member having a first surface and being movably mounted with respect to the wall such that the lower seat member is selectively rotatable between a stowed position in which the first surface is generally vertical, and a deployed position in which the lower seat member is supported by and contacts the support surface and the first surface is generally horizontal;

the seatback member having a second surface and being rotatably mounted with respect to the wall such that the seatback member is selectively rotatable between an upright position in which the second surface is generally vertical and the seatback member is at least partially recessed into a concavity defined by the wall, and a lowered position in which the second surface is generally horizontal and is over the footwell;

the seat assembly being movable between a stowed configuration in which the lower seat member is in the stowed position and the seatback member is in the upright position, a deployed configuration in which the lower seat member is in the deployed position and the seatback member is in the upright position, and an extended configuration in which the lower seat member is in the deployed position and the seatback member is in the lowered position.

14. The vehicle of claim 13, wherein at least a portion of the first surface is not covered by the seatback member when the seat assembly is in the extended configuration.

15. The vehicle of claim 14, wherein substantially the entire first surface is uncovered by the seatback member when the seat assembly is in the extended configuration.

16. The vehicle of claim 13, wherein the seatback member includes a cushion portion that defines the second surface and two support portions that operatively connect the cushion portion to the vehicle body; and wherein the lower seat member is at least partially disposed between the two support portions when the seat assembly is in the extended configuration.

17. The vehicle of claim 13, wherein a portion of the seatback member is directly forward of the lower seat member when the seat assembly is in the extended configuration.

18. The vehicle of claim 13, wherein the second surface of the seatback member defines an upper portion of a seatback portion;

the vehicle further comprising:

a cushioned member attached to the generally vertical wall and defining a lower portion of the seatback portion;

wherein the seating surface is adjacent the cushioned member with the lower seat member in the stowed position.

19. The vehicle of claim 13, further comprising:

wherein substantially all of the lower seat member is forward of the seatback member when the lower seat member is in the stowed position and the seatback member is in the upright position.

20. The vehicle of claim 13, further comprising:

a pair of child seat anchors mounted to the body adjacent a rearward portion of the lower seat member;

wherein the pair of child seat anchors are covered when the lower seat member is in the stowed position and exposed when the lower seat member is in the deployed position.

* * * * *